J. G. SMITH.
Cooking-Apparatus.

No. 198,316. Patented Dec. 18, 1877.

Witnesses.
W. H. Kennedy
Phillip Allemand

Inventor.
J. G. Smith.
Per Burridge & Co.
Att'y

UNITED STATES PATENT OFFICE.

JAMES G. SMITH, OF CHAGRIN FALLS, OHIO.

IMPROVEMENT IN COOKING APPARATUS.

Specification forming part of Letters Patent No. 198,316, dated December 18, 1877; application filed October 18, 1877.

*To all whom it may concern:*

Be it known that I, JAMES G. SMITH, of Chagrin Falls, in the county of Cuyahoga and State of Ohio, have invented new and useful Improvements in Cooking Apparatus, whereof the following is a description, reference being had to the accompanying drawings, making a part of this specification, in which—

Figure 1:
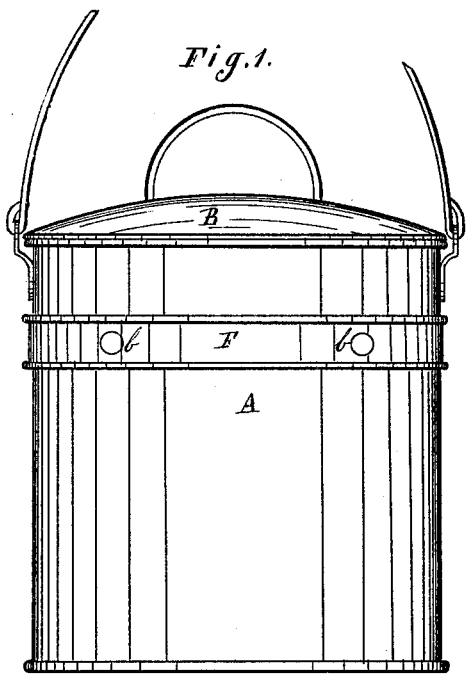
Figure 2:
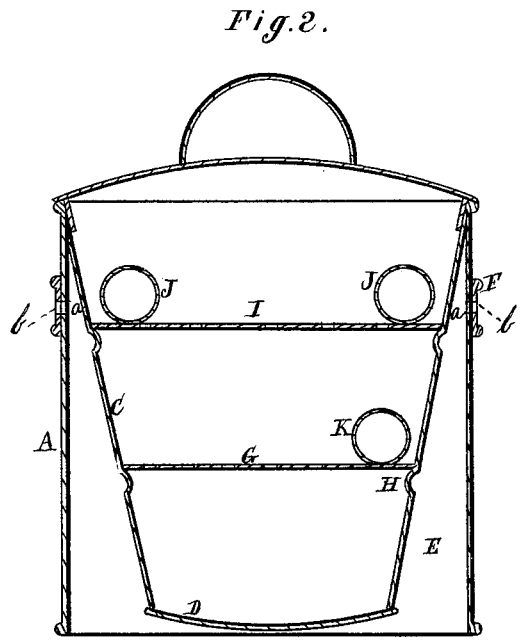
Figure 3:
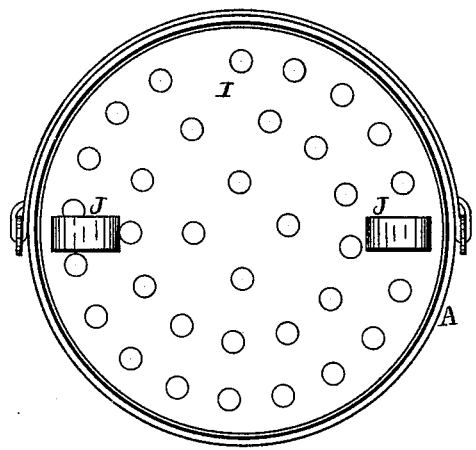

Figure 1 is a side view of the apparatus. Fig. 2 is a vertical transverse section. Fig. 3 is a plan view of the inside.

Like letters of reference refer to like parts in the several views presented.

The nature of this invention relates to a cooking utensil; and the object thereof is to cook several articles of food at once in the same vessel.

The construction of said apparatus and the manner of using the same are more fully set forth as follows:

In the drawings, A represents the outside or body of the utensil, of which B is the cover. Said body has no bottom, as will be seen in Fig. 2. Within said body is arranged a receptacle, C, tapering from the top downward to the bottom D.

The upper end of the receptacle is of a diameter to fit closely within the rim of the body A, and to which it is secured in an air or steam tight manner.

In consequence of the tapering form of the receptacle, there is formed between it and the side of the body an annular space, E. Said annular space, surrounding the receptacle, is open to the outside at the top by a series of apertures or holes, $a$, which may be more or less in number.

The holes are closed and opened by a sliding band, F, in which are holes $b$, corresponding to the holes $a$, which, on turning the band, are brought in open relation to the said holes $a$, as shown in Fig. 2, and which are closed by the band for regulating the draft, as the case may be.

G is a perforated plate, resting on an annular shoulder, H. Above said plate is a similar plate, I. Of said plates, J and K are the handles whereby they are lifted.

The practical use of the above-described apparatus is as follows: The several articles to be cooked are placed in the receptacle, some on the bottom D and others on the perforated plates G and I. The cover B is then placed on, and the apparatus stood upon the stove over an opening; or it may be stood over the burner of an oil-stove or gas-stove, as may be in use, the heat from which ascends into the annular space E, the draft of which being regulated by the sliding band F, whereby the draft-holes can be more or less closed, as desired.

The receptacle thus surrounded by the heat, the contents thereof are soon cooked by the dry heat or by steaming, in which latter case water is placed in the bottom of the receptacle in place of some article of food. The steam from the water ascends through the perforated plates, which, together with the heat transmitted through the sides of the receptacle, quickly cooks the articles therein.

What I claim as my invention, and desire to secure by Letters Patent, is—

The combination of the body A, tapering receptacle C, arranged as described, so as to form an annular space, E, around said receptacle, perforated plates G and I, cover B, and perforated sliding band F, the perforations therein corresponding to the holes $a$, substantially as and for the purpose herein set forth.

JAMES GREGORY SMITH.

Witnesses:
   IRIS C. SMITH,
   C. T. BLAKESLEE.